United States Patent [19]

Behmel et al.

[11] 4,450,257

[45] May 22, 1984

[54] PROCESS FOR PRODUCING PHOSPHORIC ACID GROUP CONTAINING POLYESTER RESINS AND THEIR USE AS PAINT BINDERS

[75] Inventors: Lukas K. Behmel; Bertram Zückert, both of Graz, Austria

[73] Assignee: Vianova Kunstharz, A.G., Werndorf, Austria

[21] Appl. No.: 517,952

[22] Filed: Jul. 28, 1983

[30] Foreign Application Priority Data

Jul. 29, 1982 [AT] Austria ............................... 2923/82
Apr. 14, 1983 [AT] Austria ............................... 1326/83

[51] Int. Cl.$^3$ ............................................. C08G 63/76
[52] U.S. Cl. ...................................... 525/437; 528/287; 528/295.5
[58] Field of Search ............... 525/437; 528/287, 295.5

[56] References Cited

U.S. PATENT DOCUMENTS 3,853,819 12/1974 Herwig et al. ...................... 528/287
3,941,752  3/1976 Kleiner et al. ...................... 528/287
4,033,936  7/1977 Bollert et al. ...................... 528/287
4,259,222  3/1981 Login et al. ...................... 525/437 X
4,314,052  2/1982 Engelhardt et al. ................ 528/287
4,315,847  2/1982 Login et al. ...................... 528/287 X
4,315,969  2/1982 Login et al. ...................... 528/287 X

*Primary Examiner*—Lucille M. Phynes
*Attorney, Agent, or Firm*—A. W. Breiner

[57] ABSTRACT

A process for producing phosphoric acid group containing polyester resins with substantially total linkage of the phosphoric acid or derivative thereof into the resin system. The process is characterized in that at least 0.1, preferably 0.2 to 1.5, moles/kg of phosphor in the form of a polyphosphoric acid and/or an acidic phosphoric acid ester of mono- or polyhydric alcohol based on the polyacid of the final product is esterified with the other reactants in a 40 to 80 percent by weight of solids containing solution of one or more diluents inert towards the raw materials employed. The reaction is carried to the substantial total linking of the phosphoric acid into the resin system and to an intrinsic viscosity of 3.0 to 25.0 ml/g (DMF, 20° C.).

12 Claims, No Drawings

PROCESS FOR PRODUCING PHOSPHORIC ACID GROUP CONTAINING POLYESTER RESINS AND THEIR USE AS PAINT BINDERS

The present invention relates to a process for introducing phosphoric acid groups into polyester resins; to the resins obtained, and to their use as paint binders.

The effect of phosphoric acid groups in paint binders, in general, is known. There are, on the one hand, accentuated mutual effects between such groups and the substrate, particularly metal substrates; and also with the pigments and extenders which lead to substantial improvements in the coatings, particularly with regard to adhesion and resistance characteristics. On the other hand, the phosphoric acid groups are excellent curing catalysts for acid catalyzed crosslinking mechanisms. The value of phosphoric acid groups in paint binders is now even more important in view of the call for paints with a low level of detrimental substances such as chrome containing anticorrosive pigments and for less energy consumption on the crosslinking of the paints.

The effects of phosphoric acid groups in binders, in part, are attributed to the acidity of the phosphoric acid groups and, in part, to the corresponding phosphate ions. In this sense, in the present invention, the term "phosphoric acid groups" embraces the acidic compounds and the salts of phosphoric acid with organic or inorganic bases. The non-ionic derivatives of phosphoric acid groups such as the esters are not included in the term.

The anticorrosive effect and the curing characteristics of paints, in practice, cannot be isolated from a number of other paint characteristics such as storage stability, behavior at application or from the possibility of obtaining radiant brilliance of the coatings. Furthermore, the obtained improvements have to be clearly reproducible in practice, with changing conditions. This, in turn, requires the concentration of phosphoric acid groups to be raised above a given minimum level, depending on the type of binder. As disclosed in AT-PS No. 356,782, for example to obtain a good water resistance on untreated steel, a level of about 0.3 mole/kg is necessary for typical high solids binders.

The addition of phosphoric acids or their low molecular weight derivatives to pigmented paints, at a concentration of markedly below 0.3 mole/kg of phosphoric acid groups, leads to a number of severe defects such as loss of gloss and reduction in tooling characteristics of the cured films. Therefore, the addition is made only to "wash-primers" for the preparation of flat anticorrosive coatings with low film thickness, enhancing adhesion.

The introduction of phosphoric acid groups into paint binders, or such combinations, is described in references such as DE-OS No. 22 04 844, GB-PS No. 13 77 854 and U.S. Pat. Nos. 3,415,766 and 3,574,566. The objectives stated in these references are not the same as set forth above, particularly with regard to the possibility of producing binders which give radiantly brilliant pigmented films free of defect which also contain high levels of phosphoric acid groups. U.S. Pat. Nos. 4,178,319; 4,178,320; 4,178,323 and 4,178,324 describe combinations of oligomer acidic phosphoric acid esters with epoxy group containing polymers, with a molar ratio of 1:1 of acid to epoxy groups. Through the reaction between both groups, difficulties are prevented; however, the content of free phosphoric acid groups is drastically reduced. Thus, such combinations do not meet the objectives as set forth above.

AT-PS No. 356,782 discloses that certain problems may be avoided by introducing the phosphoric acid into the binder by a specific method. The method, in principle, is directed to substantially reducing the content of free phosphoric acid or of low-molecular derivatives of the phosphoric acids. According to the disclosure of this reference acidic derivatives of phosphoric acid are reacted with amine-aldehyde condensation products and the obtained condensate is mixed or partially reacted with hydroxy group containing components. The process produces binders useful in heat-hardenable one-component paints which provide films which are free of defects and which have radiant brilliance on suitable pigmentation, and have good corrosion resistance. The process is specially suited for the preparation of binders for high solids paints. When preparing binders with higher molecular weight according to the method of AT-PS No. 356,782, however, problems regarding compatibility are often encountered, especially when the hydroxy component has a higher molecular weight. For this reason for many end uses such as stenciling and sterilizing paints with extreme tooling charactersitics for the coating of collapsible tubes of aluminum, or for paints drying by solvent release, the synthesis of binders carrying chemically bound phosphoric acid groups is greatly restricted.

The possibility of preparing high molecular polyester resins is disclosed in DE-OS No. 17 45 791 where the esterification is carried out in a diluted solution, and optionally with pressure, whereby it is possible to carry the reaction beyond the theoretical gel point without unusable products forming. Surprisingly, it has been found that by using such method, i.e., polyesterification in diluted solution; it is possible to introduce into polyester resins phosphoric acid groups to a quantitative degree. Thus, it is possible to prepare paint binders with a higher content of phosphoric acid groups than heretofore possible which are capable of forming coatings free of defects, having radiant brilliance with adequate pigmentation, and exhibiting high corrosion resistance and excellent mechanical properties.

Accordingly, the present invention is directed to a process for producing phosphoric acid group containing polyester resins with substantially total linkage of the phosphoric acid or derivative thereof into the resin system. The process is characterized in that at least 0.1, preferably 0.2 to 1.5, moles/kg of phosphor in the form of a polyphosphoric acid and/or an acidic phosphoric acid ester of mono- or polyhydric alcohol based on the polyacid of the final product is esterified with the other reactants in a 40 to 80 percent by weight of solids containing solution of one or more diluents inert towards the raw materials employed. The reaction is carried to the substantial total linking of the phosphoric acid into the resin system and to an intrinsic viscosity of 3.0 to 25.0 ml/g (DMF, 20° C.).

It has been established that within the above range, for defined end uses, polyesters with defined phosphoric acid amounts and with defined intrinsic viscosity ranges are preferred. The preferred ranges are:

| | |
|---|---|
| for normal spraying paints | 0.2 to 0.8 moles of phosphor per 1 kg of final product and an intrinsic viscosity range of from 3.0 to 5.0 ml/g (DMF, 20° C.) |
| for sterilizing flexible | 0.3 to 1.5 moles of phosphor per |

| | |
|---|---|
| -continued | |
| spraying or roller coating paints, e.g., for collapsible tubes | 1 kg of final product and an intrinsic viscosity of at least 6.0, preferably 8.0 to 25.0 ml/g (DMF, 20° C.). |

The term "polyester" as used herein refers to polyesters per se as well as modified polyester products such as alkyd resins or polyesters containing polymers of ethylenically unsaturated compounds, polyethers, or urethanes. The raw materials suitable for these products are known in the art and are described in publications such as K. Winnacker and L. Küchler "Chemische Technologie" (C. Hanser Publisher, Munich, 1972), or Ullmanns Encyklopädie der Technischen Chemie, 4th Edition, Volume 15, Edition Chemie GmbH., Weinheim, 1978.

To introduce the phosphoric acid groups into the resin system, the polyphosphoric acids are preferred, for example, acids of the general formula $H_{n+2}P_nO_{3n+1}$ with three or more phosphor atoms in the molecule and with P—O—P linkages. These acids normally are technical mixtures with a $P_4O_{10}$-content of form about 80 to 90 percent. They are available as two preferred alternatives, one with about 76 percent and the other with about 84 percent $P_2O_5$-content. In addition, mixtures of mono- and diesters as are obtained through reaction of phosphoric acid (84 percent $P_2O_5$-content) with mono- or polyhydric alcohols may be used. The mixtures of the esters normally contain portions of free phosphoric acid.

The reaction blends are set up according to the general principles known in the art for the preparation of phosphoric acid-free polyesters, such as described by H. G. Elias "Makromoleküle" (Huthig and Wepf, Basel-Heidelberg, 1971). When calculating the ratios of components for the reaction blend, the assumption can be made that each mole of phosphor in one of the phosphoric acids to be used with regard to its functionality replaces one mole of a dicarboxylic acid, and that thereby per each mole of phosphor present one mole of acid group is also present.

Suitable inert solvents for use according to the present invention are solvents which, under the conditions of the process of the invention, undergo practically no chemical reaction. Preferred are those diluents which are either water-immiscible or only slightly miscible in water such as toluene, xylene, or their higher homologues which alleviate the separation of the water formed during the preparation of the polyester when using a solvent cook, or such solvents, the boiling point of which is markedly above the minimum temperatures of about 150° to 200° C. required for the preparation of the polyesters. Generally, the known aromatic or aliphatic hydrocarbon solvents having a boiling range of from about 130° to 220° C., or mixtures thereof, can be used. Examples of other inert diluents are ketones or chlorinated hydrocarbons. The diluents should give homogeneous blends with the reaction mixture, at least at the reaction temperature and towards the end of the reaction. It is not necessary that the polyester resins be soluble in the diluent at room temperature.

The process of the invention can be carried out in the normal reactors used for the preparation of synthetic resins such as described in B. K. Winnacker and L. Kuchler, "Chemische Technologie", C. Hanser Publisher, Munich, 1972. Due to the strong catalytic effect of the phosphoric acid groups, although relatively low boiling diluents are used, the achieved reaction times are comparable to those normal for the preparation of polyesters which are not modified with the phosphor groups. It is not necessary, therefore, in practicing the process of the invention to use special equipment to accelerate the reaction in solution through reaction at elevated temperatures or at elevated pressure, as disclosed in DE-OS No. 17 45 791.

The chosen diluent can be added to the reaction blend either at the beginning of the reaction or at a later suitable time, for example after the raw materials have formed a clear melt. Additionally, the solvent can be added in increments. Adding the solvent after the reaction has commenced or in increments can reduce reaction times, permitting use of higher temperatures in the earlier stages of reaction.

The quantity of the diluents used in the process of the invention is chosen in order that the solids content during reaction ranges between 40 and 80 percent. In order to achieve the advantages characteristic for the process of the invention, it is necessary, particularly during the last phase of the esterification, to dilute the reaction blend to the degree necessary to permit practically total linkage of the phosphoric acid compound without gel formation. It is evident that the reaction blend will have the low viscosity corresponding to any reaction temperature. A further reduction of the solids content is required if a narrow molecular weight distribution is essential for the end use of the polyester resin.

Advantageously, the reaction is monitored via the intrinsic viscosity $[\eta]$ and the acid value. An intrinsic viscosity $[\eta]$, measured in dimethylformamide of preferably between 3 and 25 ml/g, is desired. The acid value of the products may range from between about 10 and 80 mg KOH/g.

When evaluating the conversion on introducing the acidic phosphoric acid esters into the polyester, the properties of low molecular phosphoric acid esters, or of free phosphoric acid, may serve as a basis, because low levels thereof, in combination with titanium dioxide pigments in polyester-aminoplast-combinations cause reduced brilliance. Through testing of samples with varying degree of condensation, thus consistent with practice, the introduction of the phosphoric acid esters may be evaluated.

At the end of the reaction additional solvents can be added to the batch if desired. It is evident that such solvents have to meet the criteria for diluents as set forth above. When adding solvents carrying active hydrogen atoms or ester groups, the catalytic effect of the free phosphoric ester groups, also at ambient temperature, may cause the polyester chain to split, leading to a reduction of the molecular weight. In case this reduction is not desired, the free phosphoric acid groups have to be transformed, at least partially, to their salts prior to the addition of the active solvents with suitable bases such as amines. This expediency, for example when combining with amine-formaldehyde resins, can enhance the storage stability. Type and quantity of the blocking agent are chosen in correlation with the desired reactivity and storage stability. In this connection it is remarkable that the binders produced according to the process of the invention, in conjunction with aminoplasts, even if low volatile amines such as diethanolamine or 2-amino-2-ethyl-1,3-propanediol are added, lose only little of their reactivity.

The binder solutions produced according to the present invention are processed to paints in the manner normal for polyester resins, optionally together with other resin components such as aminoplasts, and with pigments, fillers, additives and solvents. In contradistinction to coatings of analogous products free from phosphoric acid groups, the water resistance and the corrosion protection are considerably enhanced. In conjunction with amine resins, even with the totally etherified types, low curing temperatures can be utilized.

Through the selection of an adequate range of phosphor content and maintaining the intrinsic viscosity of the polyester within the given range it is possible to formulate paints which are particularly suited for spray application. Such paints exhibit the noted excellent properties even when employing curing temperatures as low as about 100° C. In particular, a content of from 0.2 to 0.8 moles of phosphor per kilogram of polyester, the phosphor being employed according to the process and in the form of a polyphosphoric acid and/or an acidic phosphoric acid ester of mono- or polyvalent alcohols and within an intrinsic viscosity range of from 0.2 to 0.8 ml/g (DMF, 20° C.), provides favorable effects. The process of the invention, however, is particularly suited for higher molecular weight products as are necessary for extreme tooling. Products with a content of from 0.3 to 1.5 moles of phosphor per kilogram of polyester and an intrinsic viscosity of over 6 ml/g (DMF, 20° C.) give the desired properties in tooling enamels, such as deep drawing and sterilizing, with curing temperatures of about 120° to 140° C., or very short curing times at normal curing temperatures, and provides paints for collapsible tubes of aluminum with outstanding "crush resistance." Additionally, the paints have good adhesion and tooling with quick deformation at low temperature. In this connection it is of great advantage that the molecular weight of the products of the invention can be considerably lower than is possible with products not containing phosphoric acid groups, for example such as are described in European patent application Nos. 00 25 089 and 00 25 478; DE-PSS Nos. 25 71 791 and 25 71 792; and DE-ASS Nos. 18 07 776, 21 26 048, and 22 11 059. The low molecular weight greatly alleviates the manipulation of the binder solutions and the production of the paints, simultaneously permitting the solids content to be increased on application.

High molecular weight binders produced according to the invention, with judicious formulation, also provide hard flexible films which dry through solvent release at room temperature. Through combination with amine resins, chemical crosslinking may be obtained. In contradistinction to the normal acid curing paints, the level of amine resin may be reduced to subordinate quantities, thus preventing brittleness in the coating upon aging. The obtained coatings demonstrate good water resistance and provide good corrosion protection.

The following examples illustrate the invention without limiting its scope. Parts or percentages are by weight unless otherwise stated. The intrinsic viscosity is measured in all cases in dimethylformamide (DMF) at 20° C.

PROCEDURE FOR THE TESTS SET FORTH IN THE EXAMPLES

Pendulum Hardness: KÖNIG, DIN 53 157

Haze:
Measured with the Gonioreflectometer GR-COMP-®—Vianova $$\beta = -\log \frac{I_S}{I_R},$$

$I_S$ intensity of diffuse light at 22.4°
$I_R$ intensity of reflected light at 20° using glass as a standard (n=1.567); illumination orifice=measuring orifice=0.6°

Values above 2.3 for white enamels are recorded as radiant by subjective standards.

Indentation: ERICHSEN, DIN 53 156

Impact Resistance: GARDNER standard, measured in inches×pounds (1 inch×1 pound=0.113 Joule)

Chip Resistance A: The coated surface is positioned at an angle of 45°. From a height of 5 m, 1000 g of nuts (type HM 6-2980.100.656) are released to fall through a tube having a diameter of 38 mm. After removing the detached particles of paint the loss of weight is recorded, a loss of less than 20 mg being recorded as very good.

Chip Resistance B: 500 g of grit (4–5 mm) are shot at the coated substrate at an angle of 45° from a distance of 20 cm (air pressure: 2 bar). The loss of weight, calculated on 100 cm² of the shot at area is recorded. Values of less than 25 mg are recorded as very good.

Mandrel Test: Tapered mandrel, minimum radius 6 mm.

Crush Resistance: After one hour of storage at −20° C. the coated panel is crushed in one impact and stretched again after warming to ambient temperature.

Grading:
  1—coating undamaged
  5—coating substantially peeled off

Deep Drawing Resistance: Round cups are produced with the Erichsen paint testing machine, model 225.

Grading:
  1—no cracks
  5—strong peel-off

Sterilization Resistance: The above round cups are subjected to sterilization for one hour at 1.4 bar overpressure (121° C.).

Grading:
  1—coating unchanged
  5—strong peel-off and/or loss of gloss.

(I) POLYETHER RESINS FOR THE FORMULATION OF PAINTS FOR SPRAY APPLICATION $([\eta]=3-5$ ml/g; P=0.2–0.8)

EXAMPLES 1–4

In a universal resin reactor, as described, for example, in B. K. Winnacker and L. Küchler, "Chemische Technologie," C. Hanser Publisher, Munich, 1972, Volume 5, page 402, the polyols and carboxylic acids listed in Table 1 are heated between about 120° to 140° C., and then the phosphoric acid compound is added to the melt. Thirty minutes after a clear melt has formed the batch is diluted to a solids content of 60 percent. Then, the reaction is carried to the end value by an azeotropic solvent procedure. The formulations of the binder compositions and relevant information are set forth in Table 1.

Key To Table 1

PSA: phthalic acid anhydride
THPSA: tetrahydrophthalic acid anhydride
AS: adipic acid
NPG: neopentylglycol
CON 50: techn. linoleic acid (ca. 50% conjugated fatty acids)
TMP: trimethylolpropane
PP 84: polyphosphoric acid (84% $P_2O_5$)
AKW 2: aromatic hydrocarbon (boiling range 162°–176° C., Kauri-Butanol value ca. 90)
DIBUK: diisobutylketone.

TABLE 1

| Ex. No. | Formula Parts | Phosphoric Acid moles/kg | Diluent (% Solids Content) | Final Data [η]/acid value |
|---|---|---|---|---|
| 1. | 73 THPSA | | | |
| | 10 AS | | AKW 2 | |
| | 75 NPG | 0.33 | | 3.75/31.0 |
| | 11 TMP | | 60% | |
| | 4.5 PP 84 | | | |
| 2. | 73 THPSA | | DIBUK | 4.2/29.5 |
| | 10 AS | 0.33 | | |
| | 75 NPG | | 60% | |
| | 11 TMP | | | |
| | 4.5 PP 84 | | | |
| 3. | 75 THPSA | | | |
| | 20 CON 50 | | AKW 2 | |
| | 67 NPG | 0.59 | | 3.8/41.3 |
| | 21 TMP | | 60% | |
| | 9 PP 84 | | | |
| 4. | 71 PSA | | | |
| | 30 AS | | AKW 2 | |
| | 80 NPG | 0.30 | | 4.7/26.9 |
| | 11 TMP | | 60% | |
| | 4.5 PP 84 | | | |

PAINT PERFORMANCE TESTS FOR THE BINDERS PREPARED ACCORDING TO EXAMPLES 1–4

(1) In known manner, using a pearl mill, a paint is prepared with the following composition:
100 parts titanium dioxide (Rutile)
85 parts binder according to Example 1 (resin solids)
15 parts hexamethoxymethylmelamine (HMMM)
0.5 parts of an available paint additive (silicone basis)

The paint is diluted to a viscosity of 20 sec, DIN 53 211/20° C. with a 1:1 blend of EGLAC and BUAC (non-volatile about 67%, 25 min/130° C.) and is applied with an air pressurized spray gun onto degreased steel with a dry film thickness of 35 to 40 μm.

Table 2 lists the results of the films cured for 25 minutes at the listed temperatures. In all cases the films showed radiant brilliance.

TABLE 2

| Curing Temperature | Pendulum Hardness(s) | Haze (β) | Indentation (mm) | Impact Resistance inches/pounds |
|---|---|---|---|---|
| 110° C. | 166 | 2.98 | 7.1 | 80/70 |
| 150° C. | 160 | 2.73 | 7.1 | 70/60 |
| 170° C. | 163 | 2.41 | 6.6 | 60/30 |

Analogous thereto the binder of Example 2 was tested, giving the same values within the limits of error.

(2) A paint of the following formula was tested:
50 parts titanium dioxide (Rutile)
50 parts $BaSO_4$ (precipitated)
1.5 parts highly dispersed diatomaceous earth
0.3 parts carbon black
85 parts binder of Example 3 (resin solids)
15 parts HMMM
0.5 parts paint additive (silicone basis).

The non-volatile substance, at a viscosity of 21 sec (DIN 53 211/20° C.) was about 63%. The paint was sprayed at a film thickness of 35 to 40 μm. Stoving temperatures (stoving time 25 min) are listed in Table 3.

TABLE 3

| Curing Temperature | Pendulum Hardness(s) | Indentation (mm) | Impact Resistance (Direct) inch/pounds | Chip Resistance A (weight loss) |
|---|---|---|---|---|
| 90° C. | 68 | 8.6 | 50 | 7 mg |
| 110° C. | 94 | 7.0 | 30 | 19 mg |
| 150° C. | 91 | 5.8 | 20 | 15 mg |

The substrate for pendulum hardness, indentation, and impact resistance was degreased steel. Chip resistance was tested on a coating system consisting of a cathodically deposited primer, the paint described above, and an available automobile finish based on a crosslinkable acrylic binder.

(3) Of the binder of Example 4 various paints were made:
Paint 1: radiant gloss red finish
Paint 2: radiant gloss white finish
Paint 3: automobile filler Paint compositions and test results are listed in Tables 4 and 5.

TABLE 4

| (Paint Compositions) | | | |
|---|---|---|---|
| Paint | 1 | 2 | 3 |
| Binder (resin solids) | 85 | 80 | 85 |
| HMMM | 15 | — | 15 |
| Isobutanol Etherified Medium Reactivity Melamine Resin (resin solids) | — | 20 | — |
| Titaniumdioxide | — | 100 | 50 |
| $BaSO_4$ (Precipitated) | — | — | 50 |
| Highly Dispersed Diatomaceous Earths | — | — | 1.5 |
| Carbon Black | — | — | 0.3 |
| Molybdate Red | 42 | — | — |
| Chinacridone Red | 4 | — | — |
| Diethanolamine | 0.5 | — | — |
| Paint Additive (Silicone Basis) | 0.5 | 0.5 | 0.5 |
| Dilution | EGLAC-BUAC 1:1 | | |
| Non-Volatile (30/120° C.) % | 57 | 63 | 65 |
| Visc. (DIN 53 211) Seconds | 21 | 23 | 23 |
| Dry Film μm | 35–40 | 35–40 | 35–40 |

TABLE 5

| Paint | 1[1] | | | 2[1] | | | 3[1] | |
|---|---|---|---|---|---|---|---|---|
| Stoving Temperature °C. (25 min) | 110 | 130 | 150 | 110 | 130 | 90 | 110 | 150 |
| Pendulum Hardness (sec) | 122 | 175 | 171 | 130 | 154 | 122 | 158 | 145 |

TABLE 5-continued

| Paint | 1[1] | | | 2[1] | | 3[1] | | |
|---|---|---|---|---|---|---|---|---|
| Haze (β) | 2.61 | 2.49 | 2.25 | 2.73 | 2.44 | — | — | — |
| Indentation (mm) | 9.8 | 9.8 | 8.6 | 7.4 | 5.6 | 9.4 | 8.0 | 6.7 |
| Impact Resistance (inch/pound) | 80/80 | 80/30 | 70/30 | 80/70 | 80/50 | 60 | 50 | 30 |
| Chip Resistance (mg weight loss) | | | | | | 15[2] 23[3] | 10[2] 18[3] | 11[2] 16[3] |
| Mandrel Test 6 mm | | | | | | | undamaged | |

[1]Substrate degreased steel
[2]Tested on the total system according to Chip Resistance Test A
[3]Tested on the total system with ED-primer and finish, according to formula 2 of Table 4, Chip Resistance Test B

(II) POLYESTER RESINS FOR STERILIZING, HIGHLY FLEXIBLE STOVING PAINTS ($[\eta]$=over 6 ml/g; P=0.3–1.5 mole/kg)

EXAMPLE 5

In the reactor as described in Example 1, 62 parts isophthalic acid, 20 parts phthalic acid anhydride, 30 parts neopentylglycol, 28 parts hexanediol-1,6; 18 parts trimethylolpropane, and 12 parts of an available polyphosphoric acid ($P_2O_5$ content 84%) are heated to 200° C. The steam temperature at the receiver should not be above 110° C. Thirty minutes after a clear melt has resulted the batch is diluted with a hydrocarbon solvent rich in aromatic constituents (boiling range 162°–172° C., Kauri-Butanol value ASTM D-1133 ca. 90) to 60 percent solids.

The reaction, with azeotropic entraining, is carried out at 170° C. to an acid value of 58 mg KOH/g and to an intrinsic viscosity $[\eta]$ of 12 ml/g. After cooling to 110° C., 9 parts dimethylethanolamine are added and the batch is diluted with monoethylene glycol monobutylether to a solids content of 55 percent. The product contains 0.92 moles/kg of phosphoric acid.

EXAMPLES 6–14

According to the formulations of Table 6, phosphoric acid modified polyesters are prepared analogous to Example 5. The following abbreviations are used in the examples and for the test results:

PSA: phthalic acid anhydride
THPSA: tetrahydrophthalic acid anhydride
IPS: isophthalic acid
AS: adipic acid
NPG: neopentylglycol
HXD: hexandiol-1,6
TMP: trimethylolpropane
HPN: hydroxpivalic acid neopentylglycolester
PP 84: polyphosphoric acid (84% $P_2O_5$)
AKW 1: aromatic hydrocarbon (boiling range 186°–205° C., Kauri-Butanol value 92.5)
AKW 2: aromatic hydrocarbon (boiling range 162°–176° C., Kauri-Butanol value ca. 90)
DMEA: dimethylethanolamine
DOLA: diethanolamine
DEDEE: diethyleneglycoldiethylether
DEDME: diethyleneglycoldimethylether
BUGL: monoethyleneglycol monobutylether
BUDIGL: diethylene glycolmonobutylether
BUAC: butylacetate
EGL: monoethyleneglycolmonoethylether
EGLAC: monoethyleneglycolmonoethyletheracetate.

TABLE 6

| Ex. No. | Composition Parts | Phosphoric Acid Mole/Kg | Diluent (% Solids) | Final Data [η]/Acid Value | Base Parts | Solvent % Solids |
|---|---|---|---|---|---|---|
| 6. | 76 PSA<br>30 NPG<br>28 HXD<br>18 TMP<br>12 PP 84 | 0.92 | AKW 1<br>→ 60% | 11.2/52.3 | 10 DMEA | DEDEE (55%) |
| 7. | 89 THPSA<br>114 HPN<br>12 TMP<br>6 PP 84 | 0.34 | AKW 2<br>→ 80%<br>at acid value 40<br>→ 60% | 22.1/26.9 | — | — |
| 8. | 45 IPS<br>57 AS<br>64 NPG<br>18 TMP<br>6 PP 84 | 0.43 | AKW 2<br>→ 65% | 16.4/34 | 5 DOLA | BUGL (60%) |
| 9. | 40 IPS<br>63 AS<br>67 NPG<br>16 TMP<br>6 PP 84 | 0.43 | AKW 2<br>→ 60% | 15.5/35 | | |
| 10. | 91 IPS<br>96 HPN<br>24 TMP<br>12 PP 84 | 0.69 | XYLOL<br>→ 80%<br>at acid value 70<br>→ 70% | 21.4/64.4 | | BUAC<br>65% |
| 11. | 74 IPS<br>20 AS<br>30 NPG<br>49 HPN<br>18 TMP<br>6 PP 84 | — | AKW 1<br>→ 60% | 18.2/34.3 | — | DEDME<br>55% |
| 12. | Composition as in 11 above | — | AKW 1<br>→ 60% | 19.1/31.1 | 10 DMEA | BUGL<br>55% |

TABLE 6-continued

| Ex. No. | Composition Parts | Phosphoric Acid Mole/Kg | Diluent (% Solids) | Final Data [η]/Acid Value | Base Parts | Solvent % Solids |
|---|---|---|---|---|---|---|
| 13. | Composition as in 11 above | — | AKW 2 → 60% | 18.9/32.7 | DOLA | BUGL 55% |
| 14.(+) | 77 IPS 20 AS 32 NPG 49 HPN 18 TMP | | AKW 1 → 60% | 22.2/8.0 | — | BUGL 50% |

(+)Comparison Example

EXAMPLE 15

Example 15 is directed to the preparation of an acrylic modified alkyd resin containing phosphoric acid groups. In a universal resin reactor 100 parts of technical isomerized linseed oil fatty acid with a content of about 50% of conjugated linoleic fatty acids, 50 parts of technical linoleic acid, 47 parts glycerol, and 30 parts trimethylolpropane are heated to 160° C. Then, 95 parts phthalic acid anhydride and a blend of 6 parts polyphosphoric acid (84% $P_2O_5$) and 6 parts ethanol are added. Within 90 minutes the temperature is raised to 180° C. The batch is diluted to 70% with AKW 1 and is esterified using an azeotropic entraining agent. When an acid value of 17.0 ml/g and an intrinsic viscosity (chloroform, 20° C.) of 10.1 ml/g are attained, the esterification is stopped.

107 parts of the 70% phosphoric acid modified alkyd resin and 58 parts of AKW 1 are heated to 90° C. Then, a blend of 19 parts methylmethacrylate, 6 parts styrene, 10 parts Shellsol AB, and 2.4 parts dibenzoylperoxide powder, 50% solids (desensitized with plasticizers) is added continuously in the course of 90 minutes. Three hours after the completed addition, one part of dibenzoylperoxide, 50% solids is added. After another four hours, the reaction is finished.

PAINT EVALUATION

Preparation And Test Of The Paints

Paints (a)–(e); Comparison Paints (Va), (Vb), and (Vc); (Collapsible Tube Paints)

According to known methods, for example using a three roll mill, paints of the following composition are prepared from the resins of the examples:
120 parts titanium dioxide (Rutile)
90 parts of resin (solids)
10 parts HMMM, 100%, or an available melamine resin, partially etherified with butanol, 60% solids in butanol (BMH)

The comparison paint (Va) 0.5 parts of p-toluol sulfonic acid and to comparison paint (Vb) 3 parts of an equimolar mixture of phosphoric acid mono- and dibutylester are added. Comparison paint (Vc) contains no further additive.

The paints are diluted with a solvent blend (AKW 1/BUGL, 2:1) to 1.5–2 Pa.s and applied to aluminum collapsible tubes on a tube painting machine. The tubes are pre-dried for 4 minutes at 90° C., printed, and cured at 150° C. for 4 minutes (dry film thickness 10 to 15 μm).

TABLE 7

| Paint | Resin Example | Melamine Resin | Pendulum Hardness (s) | Haze (β) | Crush Resistance |
|---|---|---|---|---|---|
| (a) | 6 | HMMM | 183 | 2.48 | 1 |
| (b) | 12 | HMMM | 165 | 2.33 | 1 |
| (c) | 5 | BMH | 179 | 2.32 | 2 |
| (d) | 6 | BMH | 137 | 2.35 | 1 |
| (e) | 11 | BMH | 135 | 2.37 | 1 |
| (Va) | 14 | HMMM | 153 | 2.38 | 4 |
| (Vb) | 14 | HMMM | 144 | MATT | 5 |
| (Vc) | 14 | BMH | 128 | 2.34 | 5 |

The printability is good, except for paint (Vb).

Paint (f) (Industrial Stoving Enamels)

A paint is prepared from 100 parts titanium dioxide (Rutile), 91 parts of the polyester of Example 13 (solids) and 9 parts HMMM, and diluted with a 1:1 blend of EGLAC and BUAC to a viscosity of 22 seconds (DIN 53 211/20° C.). The paint is sprayed onto cleansed steel and cured for 30 minutes each at 120° C., 140° C., and 160° C.

TABLE 8

| Curing Temperature | Pendulum Hardness (s) | Haze (β) | Indentation (mm) | Impact Resistance inch/pounds |
|---|---|---|---|---|
| 120 | 175 | 2.48 | 7.5 | 80/80 |
| 140 | 185 | 2.42 | 6.5 | 80/80 |
| 160 | 178 | 2.38 | 6.0 | 60/20 |

Paints (g) and (h); Comparison Paints (Vd) And (Ve) (Roller Coating Paints)

A paint is prepared from 100 parts titanium dioxide (Rutile), 60 g resin (solids), 20 parts (solids) of an available benzoguanamine-formaldehyde resin (etherified with butanol; 70% in butanol) 10 parts of an epoxy resin (epoxy equivalent 180–192) and each 5 parts of an available copolymer of 86% vinyl chloride and 16% vinylacetate or 83% vinyl chloride, 16% vinylacetate and 1% maleic acid. The comparison paint, in addition, contains 1% of p-toluol sulfonic acid. The paints are diluted to a viscosity of 100 to 120 seconds (DIN 53 211/20° C.) with a 1:1 blend of EGL and BUDIGL and roller coated on tin steel.
Cure: 15 min/140° C.
Dry Film Thickness: 13–17 μm
Radiant brilliance films are obtained with a haze (β) of above 2.3.
Additional properties are listed in Table 9.

TABLE 9

| Paint | Resin Example | Pendulum Hardness (s) | Deep Drawing | Sterilizing |
|---|---|---|---|---|
| (g) | 5 | 196 | 1 | 1 |
| (h) | 11 | 176 | 1 | 1 |
| (Vd) | 14 | 123 | 1 | 5 |

TABLE 9-continued

| Paint | Resin Example | Pendulum Hardness (s) | Deep Drawing | Sterilizing |
|---|---|---|---|---|
| (Ve) | 14 | 170 | 2 | 5 |

Paint (i): Automobile Filler

A paint is prepared from 50 parts of titanium dioxide (Rutile), 50 parts barytes (precipitated), 0.2 parts carbon black, 90 parts (solids) of the polyester of Example 7, 10 parts HMMM, 2 parts DOLA, and 0.6 parts of an anti-settling agent based on montmorillonite. The paint is diluted with a 1:1 blend of EGLAC/BUAC to a viscosity of 22 seconds (DIN 53 211/20° C.), sprayed onto cleaned steel panels and cured for 30 minutes at 120° C., 140° C., and 160° C.

TABLE 10

| Curing Temperature | Pendulum Hardness (s) | Indentation (mm) | Impact Resistance (Direct) inch/pounds |
|---|---|---|---|
| 120° C. | 105 | 7.0 | 60 |
| 140° C. | 118 | 9.2 | 80 |
| 160° C. | 107 | 8.0 | 30 |

Evaluation of a three-layer system: The paint is sprayed onto a zinc phosphated steel panel carrying an ED-Primer and cured at 140° C. Then an available automobile finish (curing temperature 135° C.) is applied. For comparison, an available automobile sealer based on a 7:1:2 combination of a D.C.O. alkyd, an epoxy resin, and a urea resin is employed in an analogous way.

TABLE 11

|  | Indentation (mm) | Chip Resistance B (%) |
|---|---|---|
| Paint (i) | 5 | 5 |
| Comparison | 2 | 40 |

Paints (j) and (k): Urea Resin Paint

Tinting pastes with the following composition were made:

|  | (j) | (k) |
|---|---|---|
| Titanium Dioxide (Rutile) | 30 | 60 |
| Barytes (precipitated) | 30 | — |
| Carbon Black | 0.2 | — |
| Binder of Example 10 (Solids) | 70 | 70 |

The pastes are diluted to about 50% solids with a 1:1 blend of EGALC and BUAC. Prior to application, 30 parts of an available urea-formaldehyde resin are added to each paste and the viscosity is adjusted to 25 seconds (DIN 53 211/20° C.) with BUAC. The paints cure at room temperature.

TABLE 12

| Paint | Tack-Free Hours | Pendulum Hardness 1 week | Pendulum Hardness 3 months |
|---|---|---|---|
| (j) | 1 | 63 | 92 |
| (k) | 1 | 60 | 80 |

Paint (1): Collapsible Tube Enamel Without Amine Resin

A paint is prepared from 120 parts $TiO_2$ (Rutile), 100 parts of resin (solids) according to Example 15, and 0.05 parts of cobalt (used as cobalt octoate). The paint is diluted with AKW 1 to a viscosity of about 2 Pa.s and applied to collapsible aluminum tubes. After six minutes of predrying at 80° C., the tubes are printed and cured for six minutes at 160° C. The coating has a pendulum hardness of 36 seconds, a haze of 2.45, and a crush resistance of 1.

As will be apparent to one skilled in the art, various modifications can be made within the scope of the aforesaid description. Such modifications being within the ability of one skilled in the art form a part of the present invention and are embraced by the appended claims.

It is claimed:

1. A process for producing polyester resins containing phosphoric acid groups with substantial total linking of the phosphoric acid or derivative thereof to the polyester resin system, characterized in that at least 0.1 mole/kg of the polyacid of the final product is phosphoric in the form of polyphosphoric acid; an acidic phosphoric acid ester of mono- or polyhydric alcohols, and mixtures thereof; the esterification reaction of the polyester components and the phosphoric acid group containing component being carried out in a 40 to 80 percent by weight of solids containing solution of one or more diluents inert towards the raw materials used, the reaction being continued until substantially total linking of the phosphoric acid occurs and the product has an intrinsic viscosity of from about 3.0 to 25.0 ml/g (DMF, 20° C.).

2. The process according to claim 1 wherein at from 0.2 to 1.5 mole/kg of the polyacid of the final product is phosphoric in the form of polyphosphoric acid or an acidic phosphoric acid ester of mono- or polyhydric alcohols, and mixtures thereof.

3. The process according to claim 1 further characterized in that the inert diluents are aromatic or aliphatic hydrocarbon solvents with a boiling range of between 110° and 220° C.

4. The process according to claim 3 further characterized in that the diluent is added in increments during the reaction.

5. The process according to claim 1 further characterized in that the free phosphoric acid groups are blocked through salt formation with an amine.

6. The process according to claim 5 further characterized in that the amine is an alkanolamine.

7. The polyester resins prepared according to claim 1.

8. The polyester resins prepared according to claim 4.

9. The polyester resins prepared according to claim 5.

10. The use of the polyester resins prepared according to claim 1 having a phosphor content of 0.2 to 0.8 moles of phosphor per kilogram of final product and an intrinsic viscosity of 3.0 to 5.0 ml/g (DMF, 20° C.) as a binder component in a stoving paint for spray application.

11. The use of the polyester resins prepared according to claim 1 having a phosphor content of 0.3 to 1.5 moles of phosphor per kilogram of final product and an intrinsic viscosity of at least 6.0 ml/g (DMF, 20° C.) as sterilized flexible stoving paints.

12. The use of the polyester resins prepared according to claim 1 having a phosphor content of 0.3 to 1.5 moles of phosphor per kilogram of final product and an intrinsic viscosity of from about 8.0 and 25.0 ml/g (DMF, 20° C.) as sterilized flexible stoving paints.

* * * * *